United States Patent
Munshi

(10) Patent No.: US 6,450,762 B1
(45) Date of Patent: Sep. 17, 2002

(54) INTEGRAL AFT SEAL FOR TURBINE APPLICATIONS

(75) Inventor: Jonathan Munshi, Scotia, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/774,022

(22) Filed: Jan. 31, 2001

(51) Int. Cl.[7] ............................................. F01D 5/02
(52) U.S. Cl. ...................... 415/138; 60/39.32; 60/39.37
(58) Field of Search .......................... 315/138; 60/39.32, 60/39.37, 39.75

(56) References Cited

U.S. PATENT DOCUMENTS

| | | | | |
|---|---|---|---|---|
| 3,204,969 A | * | 9/1965 | Williams | 60/39.32 |
| 3,394,919 A | * | 7/1968 | Catterfeld | 60/39.32 |
| 3,730,538 A | * | 5/1973 | Silverstone et al. | 277/96 R |
| 4,193,738 A | | 3/1980 | Landis, Jr. et al. | |
| 4,422,288 A | * | 12/1983 | Steber | 60/39.32 |
| 5,657,998 A | * | 8/1997 | Dinc et al. | 277/230 |
| 5,749,218 A | * | 5/1998 | Cromer et al. | 60/39.37 |

* cited by examiner

Primary Examiner—Edward K. Look
Assistant Examiner—Igor Kershteyn
(74) Attorney, Agent, or Firm—Banner & Witcoff, Ltd.

(57) ABSTRACT

An integral aft seal for sealing the interface between a gas turbine transition piece and first stage nozzle exhibits sufficient variable thickness to adjust for relative component movement. The seal comprises a contiguous material having opposing planar faces and stiffeners attached at each of the faces. The contiguous material has corrugations to provide variable thickness. The stiffeners are attached to the planar faces of the contiguous material and generally have the same planar shape as the seal. Flexibility in the thickness dimension due to the corrugations biases the stiffeners away from one another and into contact with the turbine components. The aft seal is affixed to the transition piece by an attachment structure that eliminates relative movement between the seal and the transition piece to thereby eliminate wear.

18 Claims, 6 Drawing Sheets

INTEGRAL AFT SEAL FOR TURBINE APPLICATIONS

BACKGROUND OF THE INVENTION

This invention relates to an aft seal for industrial gas turbine combustion systems, and more particularly, to an integral aft seal using "E" seal technology to provide variable thickness to the seal to flexibly and resiliently seal the interface between the transition piece and the first stage nozzle.

In gas turbine applications it is essential to seal the interface between two relatively movable mechanical members which are in close proximity to one another. For example, it is advantageous from a performance point of view to seal the interface between a transition piece and the first stage nozzle as this interface is prone to the leakage of gases. An aft seal is generally composed of multiple separate parts which are arranged along the periphery of the transition piece. When the turbine is in operation high temperature gases flow through this interface and cause thermal growth. The aft seal thus must be flexible enough to seal even when the interface changes in shape and/or size due to thermal growth. A seal between these two members has to have two characteristics in order to be successful: flexibly seal between relatively moving pieces in a high temperature environment, and be resistant to wear. These characteristics are difficult to achieve in a single material.

Conventionally, the aft seals that are used in gas turbine applications are made of four separate pieces: inner and outer floating seals and two side seals. The inner and out floating seals engage slots machined into the transition piece aft frame and the first stage nozzle. The side seals engage matching slots in the aft frames of adjacent transition pieces. This seal design is referred to as a floating seal due to the fact that the individual pieces are allowed to move relatively freely in their respective slots. The floating seal design is a success and lasts up to 8,000 hours in operation. These conventional floating seals, however, are limited in their applicability in a new generation of machines which are being engineered for 24,000 hours of operation between inspections. There are two main shortcomings of the floating seals: firstly, the four separate pieces do not provide maximum sealing particularly at the corners where the individual pieces come together; and secondly, the seals and aft frame slots in which they are received experience excessive mechanical distress. Major repairs are generally needed after each combustion cycle, 6500 to 8000 hours. Also, since the bulky transition pieces are generally assembled into the turbine machine in cramped quarters, proper engagement of the inner and outer floating seals into the first stage nozzle slots is often difficult to achieve.

Any improvements to the aft seal which will enable longer combustion cycles can significantly reduce operation costs by reducing the number of maintenance inspections which result in downtime. In addition, improved sealing in the aft interface between the transition piece and the first stage nozzle will significantly improve turbine efficiency.

BRIEF SUMMARY OF THE INVENTION

An integral aft seal of the present invention is a single piece seal that is comprised of a corrugated seal assembly and side seal supports. The corrugated material in the seal is referred to as the "E-seal" material for convenience. The corrugated seal assembly is comprised of the E-seal material and a stiffener attached on each planar face of the E-seal to act as wear surfaces. The overall planar shape of the E-seal assembly corresponds to the shape of the transition piece aft frame. The E-seal is a single piece of material that is corrugated into a spring-like shape arranged to provide variable thickness to the E-seal. The stiffeners attached on the faces of the E-seal bear against the turbine components in the interface to provide wear resistance. The E-aft seal is attached to a turbine component, preferably the transition piece, by an appropriate type of fastener so that there is no relative motion at this juncture and therefore no wear of the transition piece aft frame. In place between the transition piece and the first stage nozzle in this manner, the single piece E-seal assembly seals against leakage of gases even at the corners of the aft frame by flexing as necessary to maintain contact with the first stage nozzle even when the components move dynamically relative to one another.

The side seals of conventional aft seals are replaced in the present invention with supports that are attached to the nozzle retaining ring by loose fitting bolts. The supports are pressed firmly against the inner and outer radials of the first stage nozzle and held there by the compressive loading of the E-seals in the final assembly. In this manner, relative motion between the side supports and the nozzle are minimized which reduces wear, and the nozzle and retaining ring are allowed to grow thermally at different rates without causing thermo-mechanical distress to the mating parts. Each side seal support has two wings protruding from each side which fit snugly between the inside surfaces of the inner and outer radials. Two compliant seals per support seal this interface from leakage. When the supports are properly placed, these wings in combination with adjacent support and the first stage nozzle inner and outer radials form a continuous sealing surface for the E-seal. The E-seal is loaded against this surface to provide the necessary seal of compressor discharge air. The spring-like characteristic of the corrugated E-seal helps maintain constant contact between the seal, the nozzle inner and outer radials and the sealing surfaces of the supports at all times by flexing to adjust its thickness. The variable thickness of the E-seal ensures that the interface that it spans is consistently sealed.

To alleviate the effects of thermal loading on the supports due to stagnation of flow on the back side, cooling holes and slots are provided on the supports at the sealing surfaces. Alternatively, different materials such as high temperature superalloys or engineered ceramics could be used for the components to eliminate the need for cooling air which would make the air available for combustion instead. Also, by employing a superalloy or similar material, the thermal growth of the supports will be better matched with the first stage nozzle. The thermal growth of the supports and first stage nozzle can be matched closely enough to eliminate the need for compliant seals at that interface.

This E-seal for the aft frame between the transition piece and the first stage nozzle possesses a significant wear resistance advantage over conventional aft seals, and provides an improved seal of the interface for better efficiency. In addition, the single piece aft seal assembly simplifies installation during initial assembly and inspection and replacement during periodic maintenance stoppages to provide a more reliable seal and save operating costs. By rendering the aft frame almost impervious to wear, the E-seal can lengthen the cycle time by three times, up to 24,000 hours. This greatly reduces the frequency of inspections, and therefore turbine downtime.

DETAILED DESCRIPTION OF THE INVENTION

Reference is now made in detail to preferred embodiments of the invention, examples of which are illustrated in the accompanying drawings.

Figure 1:
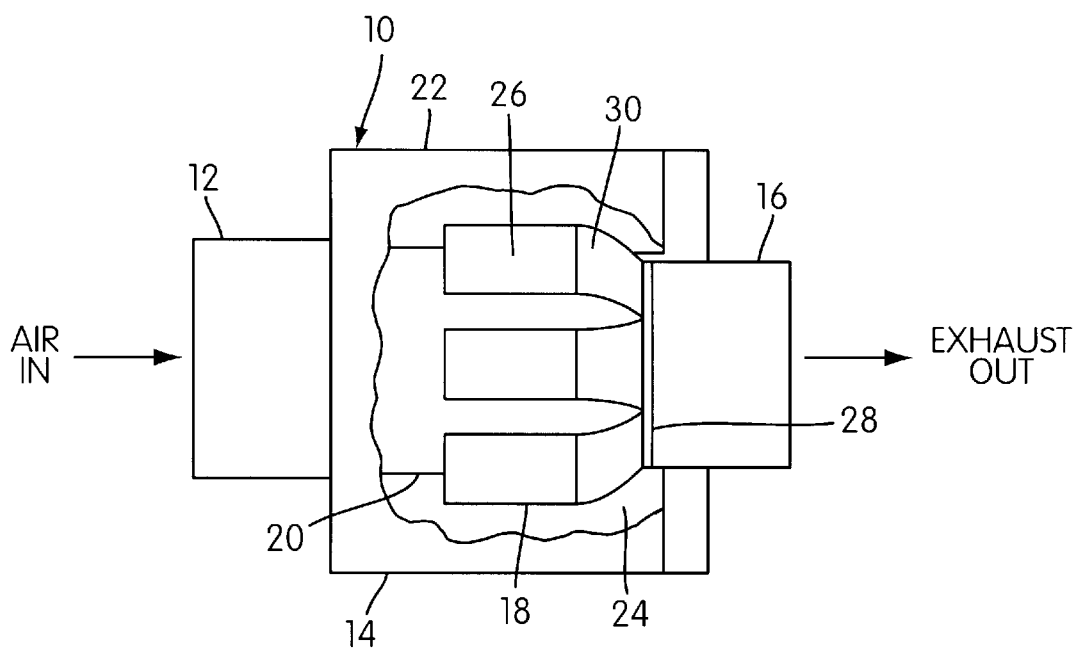
FIG. 1 is schematic view of a gas turbine with portions broken out to illustrate certain internal structures of the turbine.

Referring to FIG. 1, a schematic representation of a gas turbine 10 is illustrated having a compressor section 12 for compressing incoming air to a high pressure for delivery to a combustion section 14. Fuel is burned with the compressed air in the combustor section 14 to produce a hot, energetic flow of products of combustion to a turbine section 16 where the hot, energetic gas flow rotates a turbine wheel. The turbine wheel drives the compressor section 12 as well as an output shaft or produce thrust, depending on the application. Combustor section 14 includes a plurality of combustor cans 18 arranged in an annular array about the axis of the combustor section 14 and along its circumference. Each combustor can 18 is supplied with fuel from a fuel supply line 20. Combustor section 14 is sealed by a wrapper 22 to form a substantially sealed plenum 24 for receiving compressed air from compressor section 12 and supplying it to the combustor cans 18 through apertures in the cans, not shown. Each combustor can 18 is provided with a combustor liner 26.

Figure 2:
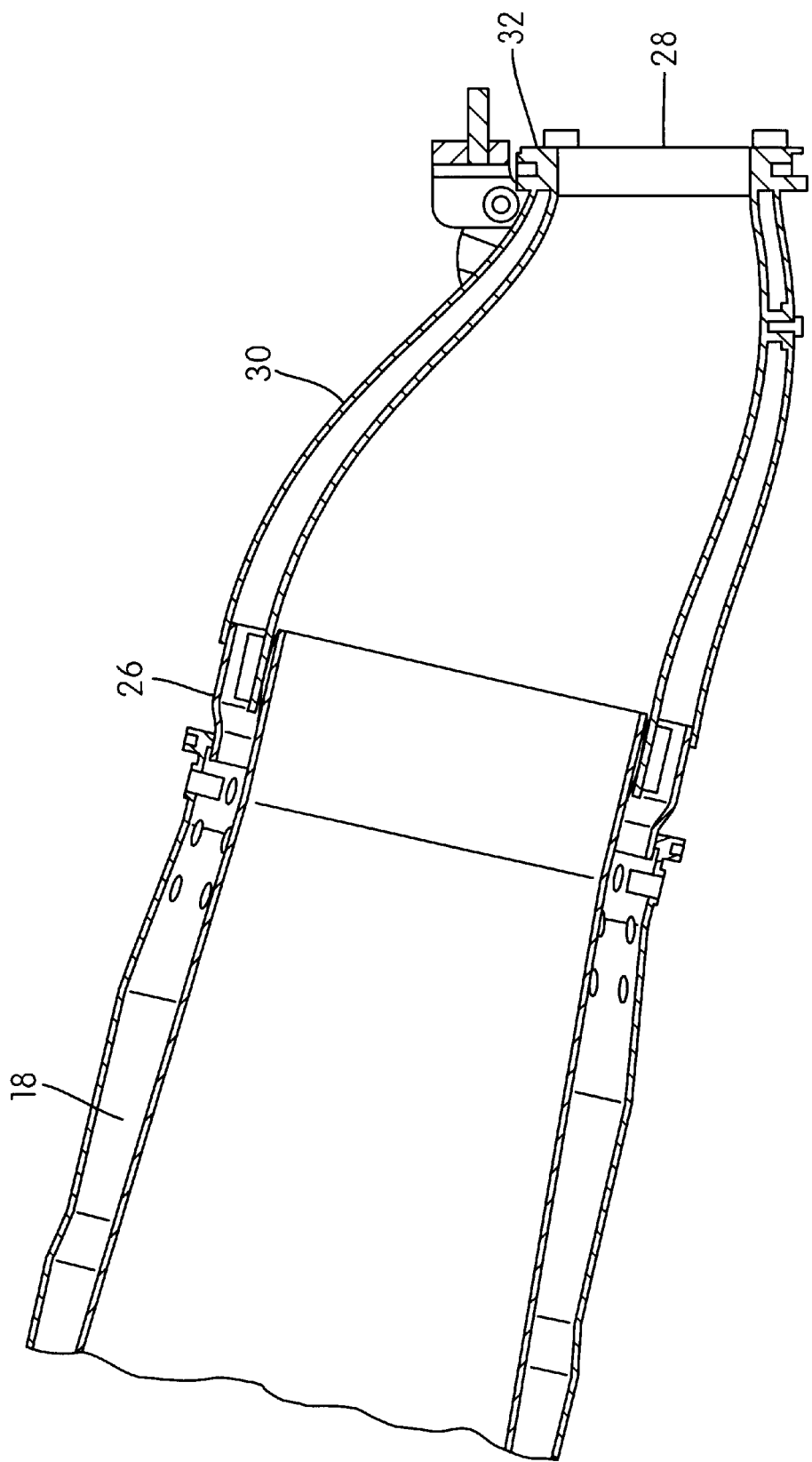
FIG. 2 is a partial cross-sectional view of a combustor liner, transition piece and first stage nozzle entrance.

To conduct the hot gases from the combustor cans 18 to the first-stage inlet 28 of the turbine 16 and reconfigure the flow from the generally cylindrical outlets of each of the combustor cans into an annular flow adjacent the first-stage turbine inlet, the energetic gases flowing from the combustor cans pass through transition pieces 30. Each transition piece 30 is a sheet metal element, generally circular in configuration at one end for sealing engagement with the outlet end of the combustor liner 26. The transition pieces have outlets at their downstream ends in the form of arcuate annular segments with inner and outer edges, FIG. 3. An annular array of such segments at the downstream outlets of the transition pieces form an annular outlet for flowing gas into the first stage turbine inlet. Thus, as shown in FIGS. 1–2, the transition pieces have intermediate portions which effectively change the shape of each piece from a circular configuration at the upstream inlet end to an annular arcuate segment at its downstream outlet end, FIG. 3. At both of these ends, seals are provided to seal the transition pieces from ingress of compressor air flow adjacent to its junction with the first stage turbine inlet.

The seal at the downstream outlet end is referred to as an aft seal and is designed to seal the interface between the arcuate annular segment of each transition piece 30 to the first stage nozzle 28. At this interface, each transition piece 30 has a the arcuate annular segment shape best shown in FIG. 3. Multiple transition pieces are arranged along an annular ring and mating first stage nozzle pieces are similarly arranged. The interface between each transition piece and first stage nozzle piece must be sealed with a seal that effectively spans the distance between these components to prevent leakage of compressor air flow. The difficulty in sealing this interface is that it is variable in size. Since the transition piece and the first stage nozzle piece are subject to thermal growth as the turbine reaches its normally high operating temperatures, the interface between them is always changing as the components expand toward one another or move back away from one another.

Figure 3:
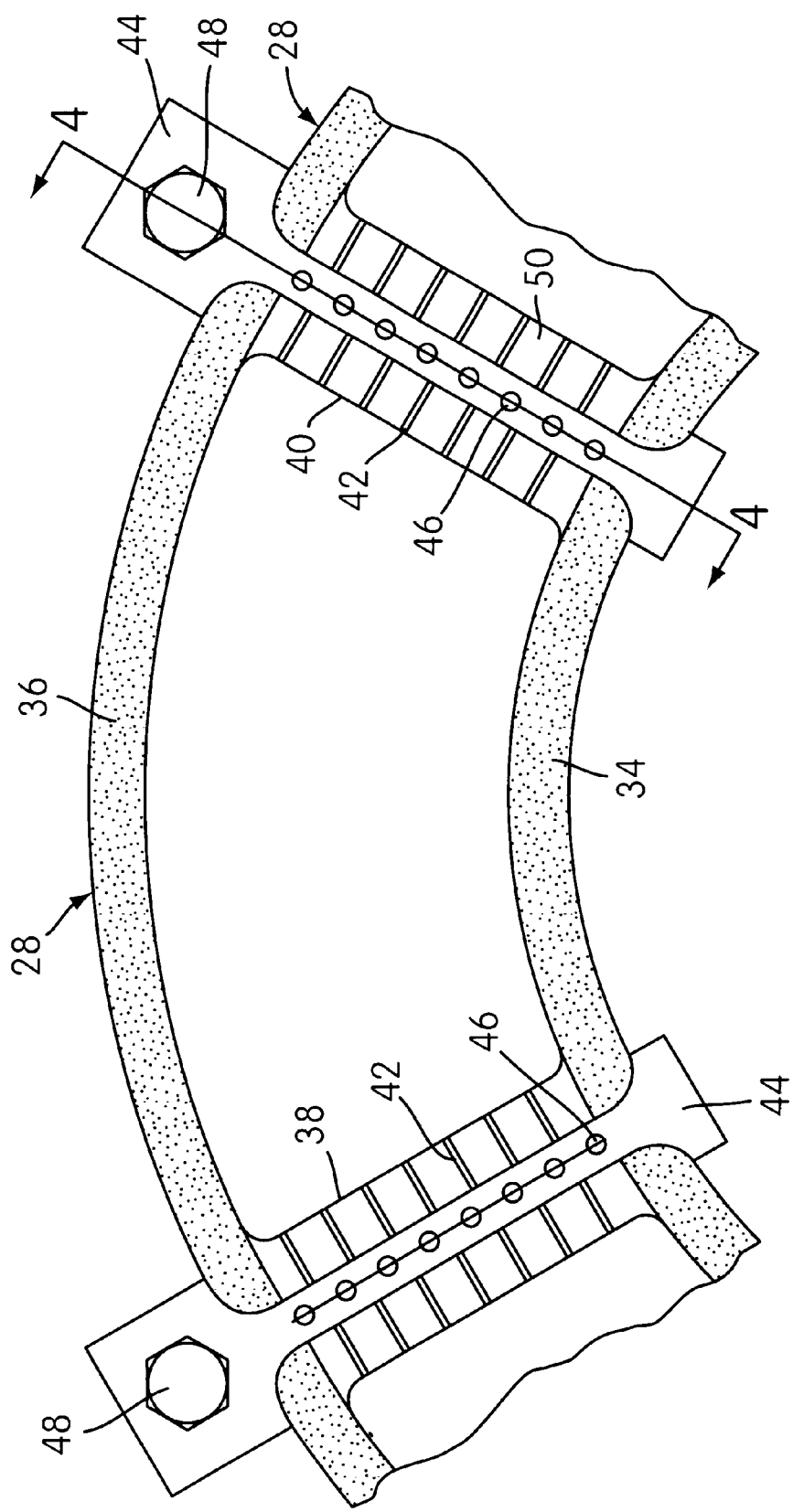
FIG. 3 is a section view of a first stage nozzle showing the side seal support assembly.
Figure 4:
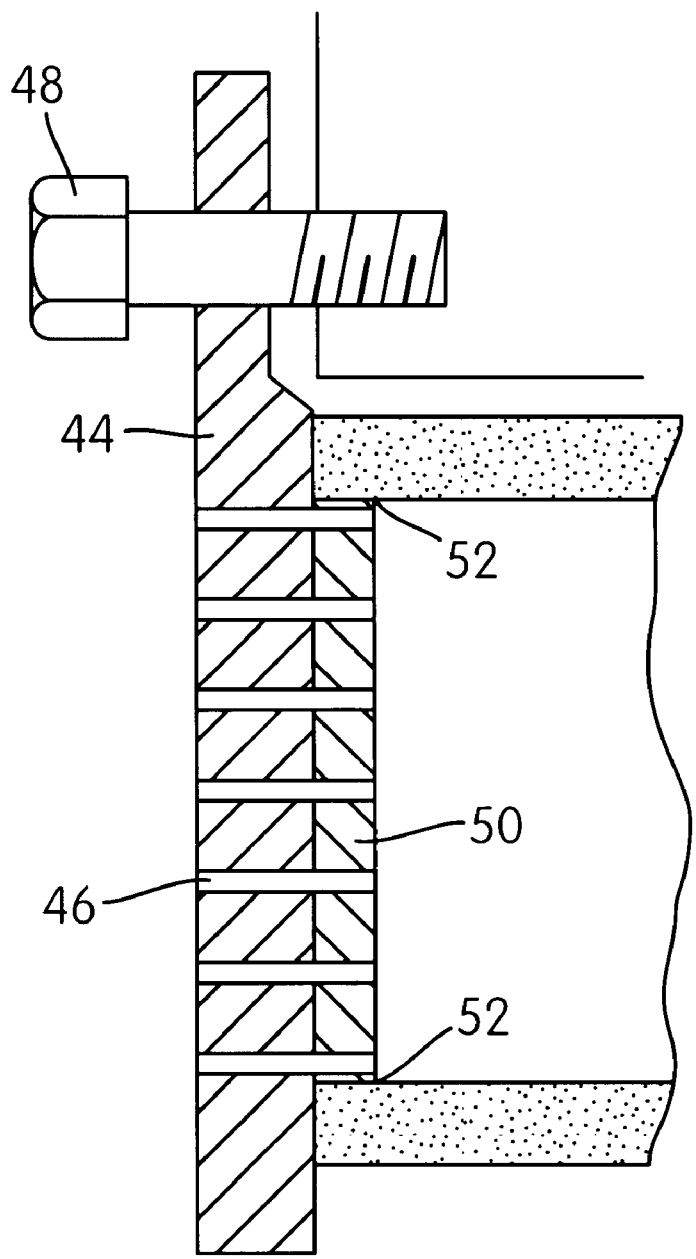
FIG. 4 is a cross-section taken along line A—A of FIG. 3.

The E-seal extends between the transition piece 30 and first stage nozzle piece 28 in abutting relation to span the distance between them, even as this distance changes. A section of a first stage nozzle piece 28 having the same shape as the arcuate annular segment of the transition piece outlet is shown in FIG. 3. The E-seal is not shown in FIGS. 3 and 4 for clarity of illustration, but it can be seen in FIG. 5 that E-seal 32 has the same shape as the section in FIG. 3 which defines the "footprint" of the E-seal.

The arcuate annular segment shape of the first stage nozzle shown in FIG. 3 comprises an inner radial 34, outer radial 36 and side surfaces 38, 40. The sides 38, 40 may have cooling slots 42 formed therein, and are supported by supports 44 which also have cooling passageways 46 provided to prevent stagnation of flow on the back side. Supports 44 are attached to the nozzle retaining ring by suitable fasteners such as bolts 48. Bolts 48 are preferably loose fitting and allow the supports to be pressed firmly against the inner and outer radials of the first stage nozzle. The supports 44 are held firmly against the first stage nozzle 28 by the compressive loading of the E-seals in the final assembly. Each support has two surfaces or wings 50 protruding from each side. Wings 50 fit snugly between the inside surfaces of the inner radial 34 and outer radial 36. Underneath the supports 44 are surfaces 52 which are preferably sealed with two compliant seals (not shown) per support. When the support 44 is properly assembled, the wings 50 in combination with adjacent supports and the inner and outer radials 34, 36, form a continuous sealing surface for a planar face of E-seal 32. A planar face of E-seal 32 bears against this entire surface to provide the necessary seal of compressor discharge air.

Figure 5:
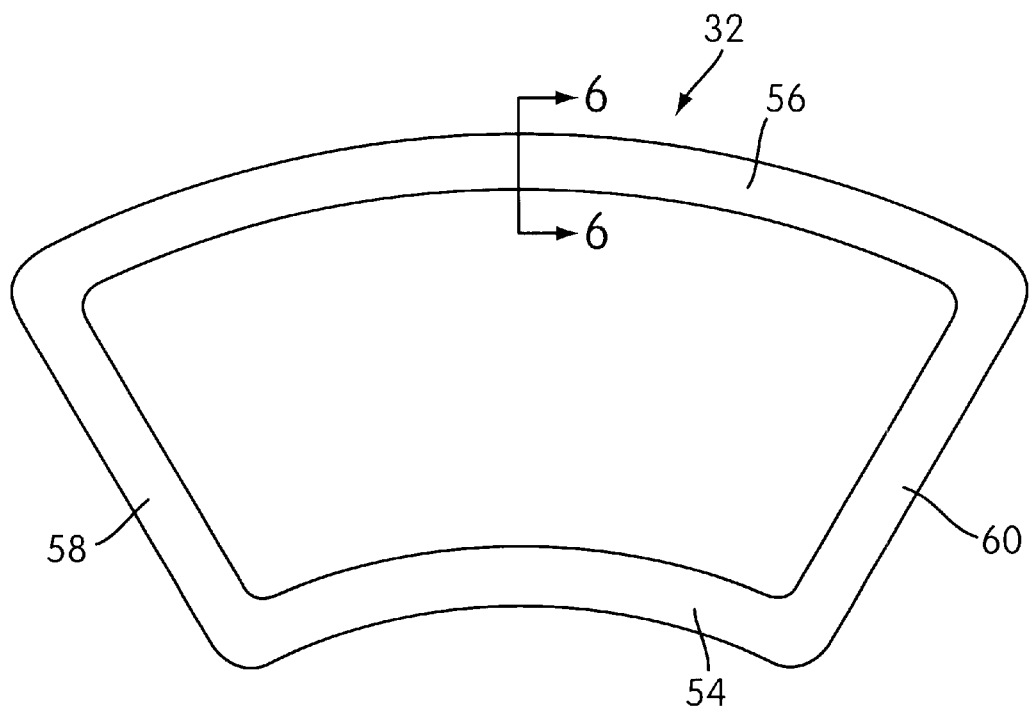
FIG. 5 is a schematic plan view of an E-aft seal assembly.
Figure 6:
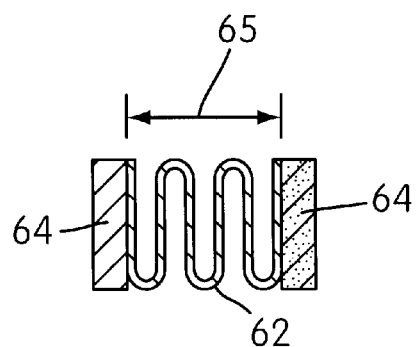
FIG. 6 is a detailed cross-section taken along line 6—6 of FIG. 5.

As described above, E-seal 32 has a planar shape that corresponds to the arcuate annular segment, FIG. 5. E-seal 32 includes an inner radial portion 54, outer radial portion 56 and side portions 58, 60. In cross-section, the thickness of the E-seal comprises a central E-seal material 62 attached to stiffeners 64 which form the planar faces of the E-seal, FIG. 6. The E-seal material is a contiguous metallic material such as X-750, a nickel based high temperature alloy that exhibits very high strength characteristics at high temperatures, up to about 1600° F. (870° C.). The respective portions of the planar face of the E-seal bear against the inner radial 34, outer radial 36 and side surfaces 38, 40 of the first nozzle stage, FIG. 3. The stiffeners are preferably attached to the E-seal material by welding, but any suitable bond could be used such as brazing, mechanical fasteners, adhesives or the like. The corrugations of the E-seal material 62 provide a spring or biasing action between the planar faces of the E-seal resulting in a variable thickness, labeled 65, to the E-seal. The spring action of the corrugated E-seal material biases the stiffeners apart from one another. This ensures that the E-seal can vary in thickness to seal the span between the turbine components even when the span changes in size during operation. The E-seal would be designed so that its uncompressed thickness is greater than the distance between the transition piece and the first stage nozzle.

Figure 7:
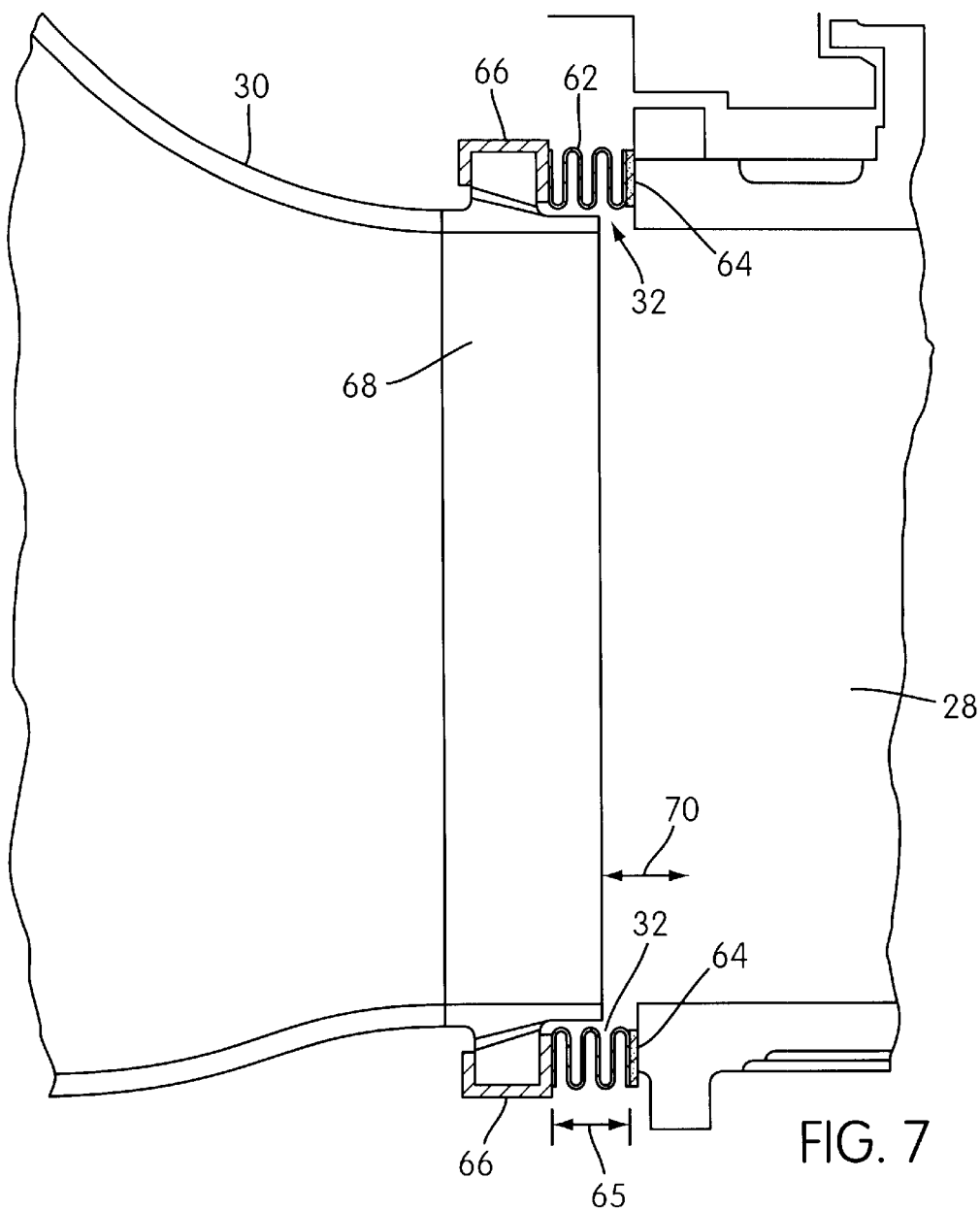
FIG. 7 is a detailed section view of an E-aft seal assembly fastened in the interface between the transition piece and first stage nozzle.

The E-seal 32 is placed between the transition piece 30 and the first stage inlet 28 in a compressed state so that its planar faces or stiffeners 64 bear against the components and the corrugations of the E-seal material 62 bias the stiffeners 64 to span the distance between these turbine components, FIG. 7. Stiffeners 64 are also wear resistant members and are made of a wear resistant material such as L-605. L-605 is a commercially available superalloy containing nickel and cobalt, which is generally used in high temperature applications such as turbines, jet engines and devices subject to high wear or fatigue. One preferred way to affix E-seal 32 into place is to form one of the stiffeners into an elongated tab 66 which is bent around aft frame 68. In this manner the transition piece side of E-seal 32 fixed to the aft frame 68 with the opposite stiffener 64 abutting against the first stage inlet 28. The corrugations of the E-seal material 62 are arranged so that the spring action occurs in the longitudinal direction labeled 70 to maintain the seal. The spring-like characteristic of the E-seal helps maintain constant contact between the seal, the nozzle inner and outer radials and the sealing surfaces at all times. The E-seal between the transition piece and the first stage inlet is flexible and can adjust dynamically to movements of either turbine component due to operational movement or thermal growth.

Figure 8:
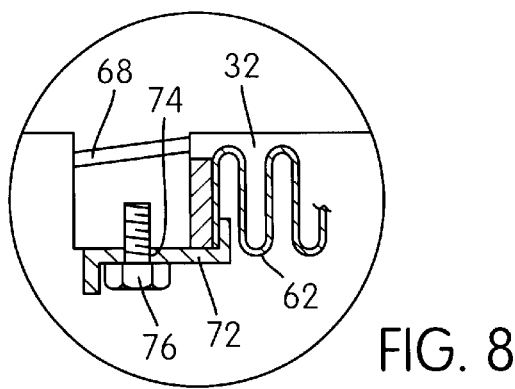
FIG. 8 is a detailed section view of an alternative fastening configuration for the assembly shown in FIG. 7.

An alternative way to attach the E-seal into place is shown in FIG. 8 and involves an elongated tab 72 with a threaded fastener aperture 74 therein attached to central E-seal material 62. A fastener 76 is employed to fasten the tab 72 of the E-seal 32 to the aft frame 68. Any other suitable method of attaching a tab of the E-seal to the aft frame is contemplated to be within the scope of this invention.

The face type interface of the E-seal 32 simplifies attachment of the transition piece assembly into the machine as there is no need to engage the seals into the nozzle slots. Mechanical fastening of the E-seal 32 by either the bent tabs 66 or fastener tabs 72 allows for simple field replacement of the seal. Field assembly is further simplified by eliminating the need to insert a side seal into adjacent transition pieces after they are in place as required with conventional aft seals. With the E-seal of the present invention, the side seal support is attached to the first stage nozzle retaining ring prior to assembly of the transition piece.

In addition, the elimination of retaining slots in the transition aft frame and the first stage nozzle results in elimination of a major source of wear and greatly reduces the cost and manufacturing complexities of the components.

Since the entire arcuate annular segment shape is sealed by a one-piece integral E-seal, any leakages that occur in the conventional four-piece seals are eliminated, particularly in the corners. Also, because the E-seal is affixed to the aft frame, relative motion between the transition piece and the supports 44 is eliminated thereby eliminating the mechanical distress that conventionally sealed turbine components experience. The static connection between the aft frame and the seal eliminates wear at that interface.

The E-aft seal 32 is an effective seal with significantly more flexibility to maintain the seal, more wear resistance and simplified assembly than conventional seals. Cost advantages are present in two ways: increased cycle time due to better wear resistance, and reduced manufacturing costs due to elimination of the expensive plasma coating process of prior art seals.

Maintenance inspections are required but costly. Since the turbine must be shut down for inspections, no power is being generated. In addition the producer must pay for the inspection and inspection crew. A routine inspection can take up to two days. Lengthening the cycle time between inspections will provide significant cost advantages. First, reduced idle time as the turbine does not need to be shut down as often. And second, reduced inspection costs as the frequency of inspections decreases. The E-aft seal of the present invention provides significant wear resistance advantages and sealing advantages to achieve longer cycle times.

Thus has been described an E-aft seal for sealing the interface between the transition piece and the first stage nozzle comprised of an E-seal material bonded to stiffeners. The E-seal is arranged so that the corrugations lend a spring characteristic that biases the seal's stiffeners against the two turbine components. The E-seal is affixed to the aft frame of the transition piece to eliminate relative movement and thereby reduce wear. The single-piece integral E-seal simplifies assembly and seals reliably to lengthen the cycle time between inspections. The foregoing explanation includes many variations and embodiments, and the invention is not intended to be limited to the specific details disclosed herein, but only by the claim appended hereto.

What is claimed is:

1. An integral aft seal for sealing an interface between a transition piece component and a first stage nozzle component of a gas turbine, said aft seal comprising:
    a monolithic and consubstantial seal material having a planar shape including an inner radial portion and an outer portion connected by side portions, and a variable thickness sufficient to span and seal the interface between the outlet of the transition piece and the inlet of the first stage nozzle.

2. The aft seal of claim 1 wherein said seal material has a cross section comprising a serpentine shape.

3. The aft seal of claim 1 wherein said seal material comprises X-750 alloy.

4. An integral aft seal for sealing an interface between a transition piece component and a first stage nozzle component of a gas turbine, said aft seal comprising:
    a contiguous material having a planar shape including an inner radial portion and an outer portion connected by side portions, and a variable thickness to span and seal the interface, wherein said contiguous material comprises corrugations to provide sufficient flexibility for said variable thickness; and
    a stiffener attached to said contiguous material at each planar face such that one said stiffener contacts and abuts against the transition piece and another said stiffener contacts and abuts against the first nozzle stage to provide wear resistance and to seal the interface therebetween.

5. The aft seal of claim 4 wherein one said stiffener comprises an attachment structure for affixing said seal to one of said components.

6. The aft seal of claim 5 wherein said attachment structure comprises a bendable tab adapted to be fitted onto an aft frame of the transition piece to thereby affix said seal thereto.

7. The aft seal of claim 5 wherein said attachment structure comprised a tab and an aperture for reception of a connector for affixing said seal to an aft frame of the transition piece.

8. The aft seal of claim 4 wherein said stiffeners are comprised of L-605 alloy.

9. A variable thickness, integral seal for sealing an interface between components in a gas turbine, said seal comprising:
    a monolithic and consubstantial seal material having a planar shape corresponding to the shape of the interface, said seal material having a compressible thickness sufficient to span the interface; and a pair of planar stiffeners having a planar shape corresponding to the shape of the interface, each said stiffener attached to a planar face of said seal material.

10. The integral seal of claim 9 wherein said seal material has a cross section comprising a serpentine shape.

11. The integral seal of claim 10 wherein said planar shape includes an inner radial portion and an outer radial portions connected by side portions to form an arcuate annular segment.

12. The integral seal of claim 11 wherein said stiffeners are formed of wear resistant material.

13. The integral seal of claim 9 further comprising an attachment structure on one of said stiffeners for attaching said seal to at least one of the components of the gas turbine.

14. The integral seal of claim 12 wherein said attachment structure comprises an extended tab with an aperture for a connector.

15. A variable thickness, integral seal for sealing an interface between components in a gas turbine, said seal comprising:

a contiguous seal material having a planar shape corresponding to the shape of the interface, said seal material being flexible in a thickness dimension;

a pair of planar stiffeners each having a planar shape corresponding to the shape of the interface, each said stiffener attached to a planar face of said seal material; and an attachment structure on one of said stiffeners for attaching said seal to at least one of the components of the gas turbine, wherein said attachment structure comprises a bendable tab.

16. A variable thickness, integral seal for sealing an interface between components in a gas turbine, said seal comprising:

a contiguous seal material having a planar shape including an inner radial portion and an outer radial portion connected by side portions shaped to form an arcuate annular segment, said seal material including corrugations along a thickness dimension to provide flexibility and variability to the thickness;

a first planar stiffener having a planar shape corresponding to the planar shape of said seal, said stiffener attached to a planar face of said seal material to provide a wear resistant face to said seal, and;

an attachment structure for attaching said seal to one of the components, wherein said attachment structure comprises a bendable tab on said first planar stiffener for affixing said seal to one of the components.

17. A variable thickness, integral seal for sealing an interface between components in a gas turbine, said seal comprising:

a contiguous seal material having a planar shape including an inner radial portion and an outer radial portion connected by side portions shaped to form an arcuate annular segment, said seal material including corrugations along a thickness dimension to provide flexibility and variability to the thickness;

a first planar stiffener having a planar shape corresponding to the planar shape of said seal, said stiffener attached to a planar face of said seal material to provide a wear resistant face to said seal, and;

an attachment structure for attaching said seal to one of the components, wherein said attachment structure comprises an extended tab with an aperture on said first planar stiffener for affixing said seal to one of the components by a threaded connector.

18. An integral seal for use in a gas turbine, comprising:

a single piece of corrugated seal material configured to circumscribe the opening of a first stage turbine inlet of a gas turbine engine and to span the interface between said opening and a transition piece outlet;

a first sealing surface comprising one of a planar face of the seal material and a planar stiffener attached to the seal material; and a second sealing surface comprising a planar stiffener attached to the seal material and configured such that, when said integral seal is installed, the seal material biases the first and second sealing surfaces to span and seal the distance between the turbine inlet and transition piece outlet.

* * * * *